(12) United States Patent
Heimbuch et al.

(10) Patent No.: US 6,246,446 B1
(45) Date of Patent: Jun. 12, 2001

(54) AUTO FOCUS SYSTEM FOR A SLM BASED IMAGE DISPLAY SYSTEM

(75) Inventors: Scott Heimbuch, Dallas; James Vorgert, Plano, both of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 08/872,634

(22) Filed: Jun. 10, 1997

(51) Int. Cl.$^7$ .................................................. H04N 5/74
(52) U.S. Cl. ..................... 348/750; 348/744; 348/745; 348/781; 359/205; 359/215
(58) Field of Search ................... 348/744, 745, 348/746, 747, 750, 345, 346, 347, 348, 349, 350, 351, 352, 353, 354, 355, 356, 357, 742, 771, 739, 781, 791, 755, 770, 268, 749; 359/205, 215, 224, 230, 443

(56) References Cited

U.S. PATENT DOCUMENTS

| 3,639,047 | * | 2/1972 | Holle ........................................ 353/69 |
| 4,560,864 | * | 12/1985 | Kinoshita ............................... 250/201 |
| 5,061,049 |   | 10/1991 | Hornbeck ............................... 359/224 |
| 5,079,544 |   | 1/1992 | DeMond et al. ..................... 340/701 |
| 5,105,369 |   | 4/1992 | Nelson ................................... 364/525 |
| 5,276,523 |   | 1/1994 | Kurematsu et al. ................. 358/236 |
| 5,278,652 |   | 1/1994 | Urbanus et al. ..................... 358/160 |
| 5,424,868 |   | 6/1995 | Fielding et al. ..................... 359/634 |
| 5,452,024 | * | 9/1995 | Sampsell ............................... 348/755 |
| 5,479,225 |   | 12/1995 | Kuga ..................................... 353/101 |
| 5,508,825 | * | 4/1996 | Kataoka ................................ 358/474 |
| 5,565,882 | * | 10/1996 | Takanashi ............................. 348/744 |
| 5,589,874 | * | 12/1996 | Buchin ................................... 348/72 |
| 5,633,755 | * | 5/1997 | Manabe ................................. 348/744 |
| 5,754,147 | * | 5/1998 | Tsao ........................................ 345/6 |
| 5,777,589 | * | 7/1998 | Gale ....................................... 348/744 |
| 5,777,696 | * | 7/1998 | Inoue ..................................... 348/744 |
| 5,790,190 | * | 8/1998 | Mogamiya ............................ 348/350 |
| 6,002,452 | * | 12/1999 | Morgan ................................. 348/742 |
| 6,110,652 | * | 8/2000 | Stork ..................................... 430/332 |

FOREIGN PATENT DOCUMENTS

| 04123030 | * | 8/1994 | (EP) | .............................. G03B/21/00 |
| 06186474 | * | 8/1994 | (EP) | ................................ G02B/7/36 |
| 0 617 306 A1 |  | 9/1994 | (EP) | . |
| 4-123030 |  | 4/1992 | (JP) | . |
| 6-186474 |  | 7/1994 | (JP) | . |

* cited by examiner

*Primary Examiner*—Matthew Luu
*Assistant Examiner*—Wesner Sajous
(74) *Attorney, Agent, or Firm*—Charles A. Brill; Wade James Brady, III; Frederick J. Telecky, Jr.

(57) ABSTRACT

An image display system (10) having an auto-focus system (24). An image sensor (20) such as a CCD camera, senses the sharpness of pixels (26) comprising a portion of the image at a screen (16), preferably a magnified portion of the image. A sensor data processor (22) processes the pixel data from the sensor (20), and instructs the auto focus system (24) to adjust an optical parameter such as the focal length of a projector lens (14) as a function of the sensor (20) output. A DMD-type SLM is preferably utilized due to the uniform geometric features of the pixel mirrors, but other SLM's can be used. The sharpness or contrast between an "on" and an "off" pixel is sensed, and preferably a 10×10 array of pixels arranged in a checker board pattern is sensed.

36 Claims, 3 Drawing Sheets

AUTO FOCUS SYSTEM FOR A SLM BASED IMAGE DISPLAY SYSTEM

FIELD OF THE INVENTION

The present invention is generally related to an image display system including a spatial light modulator modulating incident or transmitted light to form an optical image, and more particularly, to a display system incorporating an auto-focus system for insuring the displayed image is automatically in focus at the display image plane.

BACKGROUND OF THE INVENTION

Spatial Light Modulators (SLM's) are widely used in the industry for video monitors, graphic displays, projectors, and hard copy printers. Spatial light modulators typically modulate incident light to form a light image. This light image is directed to a screen in the case of a projector, video monitor or display, or is ultimately focused on a light sensitive material, such as a photoreceptor drum, in the case of a xerographic printer.

A recent innovation of Texas Instruments Incorporated of Dallas, Tex. is the digital micromirror device (DMD). The DMD is a spatial light modulator suitable for use in displays, projectors and hard copy printers. The DMD is a micromechanical monolithic single-chip integrated circuit, comprised of a high density area array of 16 micron square deflectable micromirrors on 17 micron centers. These mirrors are fabricated over address circuitry including an array of memory cells and address electrodes, these memory cells being controlled by a row address circuit and loaded/unloaded by column pixel data shift registers. Each mirror forms one pixel of the DMD array, and is bistable through electrostatic attraction forces, that is to say, stable in one of two deflected positions. A source of light is directed upon the mirror array, and is reflected in one of two directions by each mirror. In one stable "on" mirror position, incident light is reflected by the mirror to a collector lens and focused on the display screen, or directed to the photoreceptor drum, and comprises one pixel. In the other "off" mirror position, light directed on the mirror is deflected to a light absorber. Each mirror of the array is individually controlled to either direct incident light into the collector lens, or, to the light absorber. The collector lens may be used in combination with a light prism to ultimately focus and magnify the light image from the pixel mirrors when projected onto a display screen to produce a viewable image. If each pixel mirror of the DMD array is in the "on" position, the light image will be a bright array of pixels.

For a more detailed discussion of the DMD device, cross reference is made to U.S. Pat. No. 5,061,049 to Hornbeck, entitled "Spatial Light Modulator and Method"; U.S. Pat. No. 5,079,544 to DeMond, et al, entitled "Standard Independent Digitized Video System"; and U.S. Pat. No. 5,105,369 to Nelson, entitled "Printing System Exposure Module Alignment Method and Apparatus of Manufacture", each patent being assigned to the same assignee of the present invention, and the teachings of each are incorporated herein by reference. Gray scale of the pixels forming the image is achieved by pulse width modulation techniques of the mirrors, such as that described in U.S. Pat. No. 5,278,652, entitled "DMD Architecture and Timing for Use in a Pulse-Width Modulated Display System", assigned to the same assignee of the present invention, and the teachings of each are incorporated herein by reference.

Image display systems, such as those incorporating the DMD device, require that the image projected on the display screen be in focus, for both rear-screen and front-projection display systems. In some conventional auto-focusing systems, an infrared-type range-finder system is employed to determine the distance from the projector lens to the image plane, i.e. the screen, and adjust the focal length of the projector lens based on the ascertained distance. Such a system is relatively expensive and subject to some discrepancies.

The present invention sets forth to provide an inexpensive auto focus system for an image display system, and particularly, for an image display system including a micromechanical SLM such as the DMD having an array of micromechanical pixels with well defined geometric physical features.

SUMMARY OF THE INVENTION

The present invention achieves technical advantages as an auto-focus system for a spatial light modulator-based image display system whereby focus is established by sensing the sharpness of individual pixels generated by discrete features of the SLM device, rather than the sharpness of the image projected by the spatial light modulator device. In essence, the physical features of the SLM are sensed and focused upon, rather than the image formed by the pixels, these features being ascertained by sensing a predetermined pixel pattern on a display screen, such as pixels rendered in a checker board pattern. A sensor, such as a CCD camera, senses the sharpness of the pixels in the pattern whereby the focal length of the projector lens is adjusted until the pixels are in focus. A display system employing a DMD-type SLM is preferred due to the uniform rectangular geometry and spacing of the pixel mirrors which, in turn, generate a uniform rectangular "on" pixel on the display screen. The edges of the "on" pixel are sharp and can be easily focused upon using a CCD camera or the like.

The preferred embodiment of the present invention comprises an image display system, and a method for operating such display system. The display system comprises a light source generating light and a spatial light modulator modulating the light to form an image comprised of pixels on an image plane, such as a screen. An optical system, preferably including a projector lens, focuses the image on the screen, whereby a sensor senses a focus of at least one pixel projected on the screen and provides a sensor output indicative thereof. An adjustment device alters an optical parameter of the optical system, preferably the focal length of the projector lens as a function of this first output. Preferably, the sensor provides the first output as a function of the sensed sharpness of several pixels of the projected image on the screen. Ideally, the sensed pixels have a high contrast in intensity from pixel-to-pixel, such as a checker board pattern. The sensor may comprise a CCD camera or the like. This adjustment device preferably comprises a servo mechanism or other suitable device for adjusting the focal length of the projector lens.

The method according to the preferred embodiment of the present invention focuses a display system including a light source generating light, a spatial light modulator (SLM) modulating the light, and a projector lens focusing the modulated light on an image plane. The method comprises the steps of illuminating the SLM with the light to define an image comprised of pixels at the image plane. The sharpness of at least one pixel of the image is sensed. The focal length of the projector lens is adjusted as a function of the sensed pixel sharpness until the image is brought into focus on the image plane. Preferably, several pixels rendering a pattern are sensed. Preferably, the SLM is a micromechanical device whereby the pixel-members have a uniform geometry which, in turn, generate corresponding uniform shaped pixels at the image which can be focused upon by the sensor. The sensing of the pixels at the screen can be sensed one of two ways. First, by sensing pixels through the projector lens itself, or, secondly by sensing the pixels from lateral of the projector lens.

The present invention derives technical advantages in that the DMD device comprises pixel-members having a uniform geometry, and thus, generate a pixel having a uniform geometry which can be easily focused upon. For instance, a square micromirror generates a square pixel at the image plane which can be easily focused upon. By sensing, for instance, a 10×10 array of pixels comprising a portion of the image, the projection lens can be adjusted until these sensed pixels are in focus at the image plane, i.e. the screen.

DETAILED DESCRIPTION OF THE PREFERRED EMBODIMENT

Figure 1:
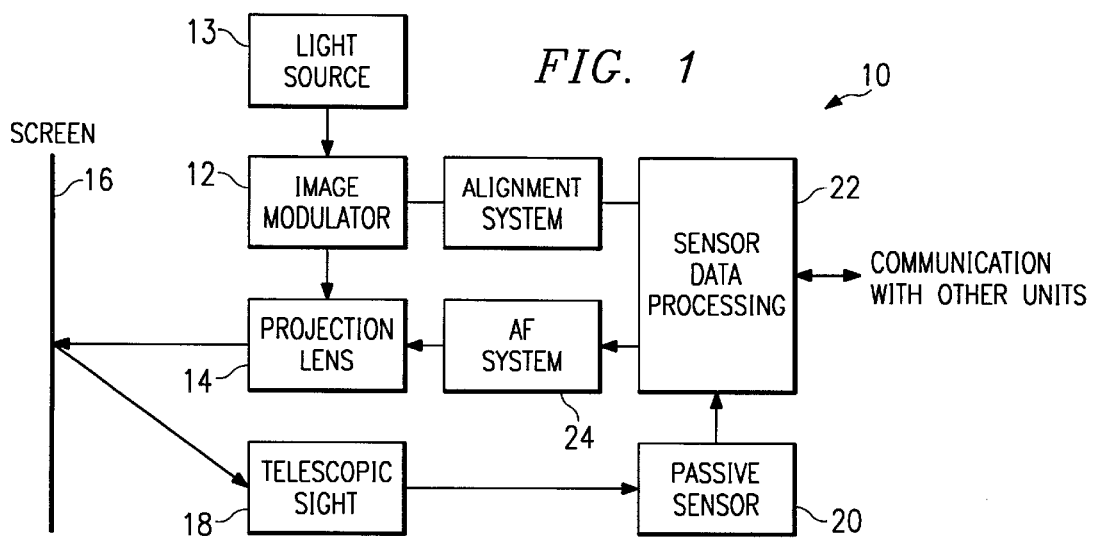
FIG. 1 is a functional block diagram of an image display system having an auto-focus system according to the preferred embodiment of the present invention.
Figure 2:
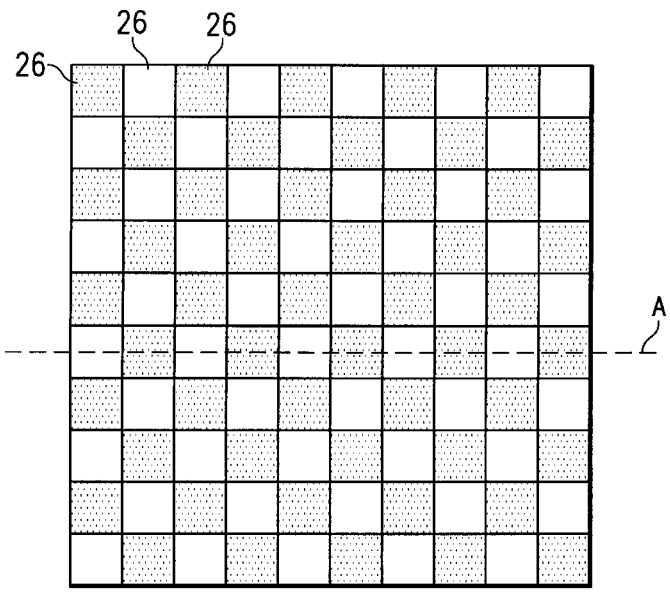
FIG. 2 is an illustration of the checker board pattern rendered by the pixels during the auto-focus routine.
Figure 3:
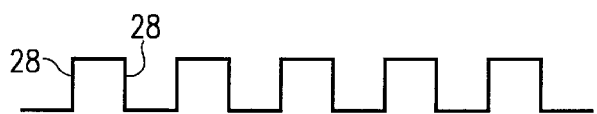
FIG. 3 is a graph of the intensity of the pixels along line A in FIG. 2, whereby the sharpness of the transitions from an "on" to an "off" pixel are sensed.

Referring first to FIG. 1, there is generally shown at 10 an image display system including an auto-focus system according to the preferred embodiment of the present invention. System 10 is seen to include an image modulator 12 such as a spatial light modulator (SLM), and preferably a digital micromirror device (DMD) such as that manufactured by Texas Instruments Incorporated of Dallas Tex. Modulator 12 modulates light from light source 13 to generate an image. Display system 10 is also seen to include a projector lens 14 focusing the image generated by modulator 12 at a display image plane, preferably a display screen 16. A telescopic sight 18 magnifies several pixels from a portion of the image at the display image, preferably from the center of the image, displayed at screen 16 and provides these magnified pixels to a high-definition sensor 20, such as a CCD camera, although other data collection mechanisms can be used such as active sensors. A sensor data processor 22 processes information provided by sensor 20, which information is indicative of the sharpness i.e. focus of the pixels from the image portion provided by telescopic sight 18. An auto focus system 24 adjusts an optical parameter of the optical system, preferably adjusting the focal length of projector lens 14 as a function of the sensed pixel focus determined by sensor data processor 22. That is, sensor 20 senses the sharpness of the magnified pixels 26 from a portion of the display screen 16, preferably rendered a checker board pattern comprising pixels set alternatively "on" and "off", as shown in FIG. 2. Processor 22 instructs auto focus system 24 to adjust the focal length of projector lens 14 until the sensed transitions in intensity from a row of "on" and "off" pixels along row A shown in FIG. 3, as detected by sensor 20, is determined to be sharp and thus in focus. The algorithm by which auto focus system 20 adjusts the projector lens focal length will be discussed shortly in regards to FIG. 6.

Figure 4:
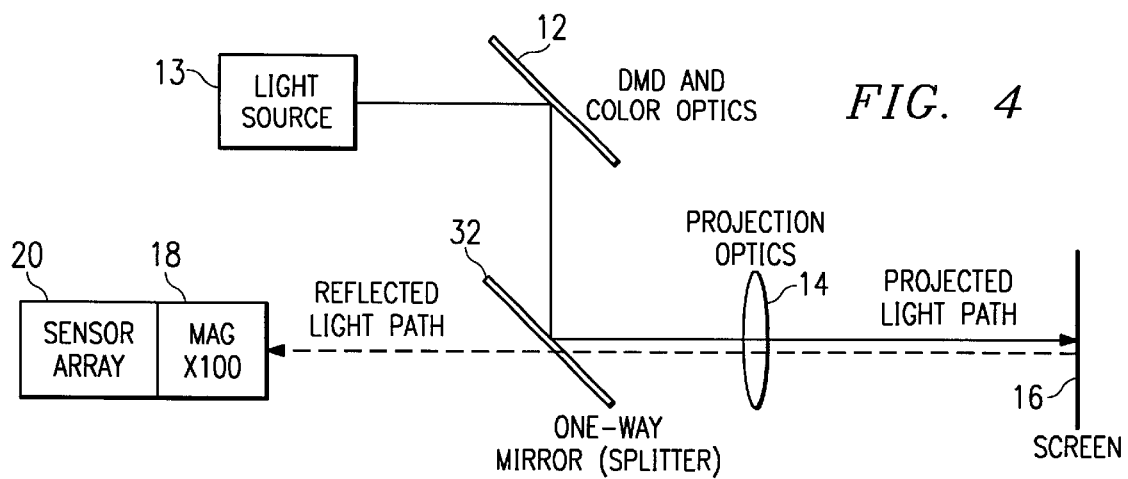
FIG. 4 is a first preferred embodiment of the present invention illustrating an optical auto-focus system integrated with the projection optics of the display system.

Referring to FIG. 4, there is shown a first preferred embodiment of the present invention whereby the optical sensing devices 18 and 20 are integrated with the projection optics including projection lens 14. In this embodiment, light source 13, such as an arc lamp, uniformly illuminates a DMD spatial light modulator 12. This light may be sequentially colored with a color wheel, or be a single color if, for instance, one DMD is utilized to modulate each of the three primary colors Red, Blue and Green. DMD 12 modulates the incident light and forms a light image which is reflected by mirror 32 and focused onto display screen 16 by projector lens 14. As shown in FIG. 4, the one-way mirror (splitter) 32 reflects the modulated light image from DMD 12 and directs it through the pupil of projection optics 14 onto display screen 16. As denoted by the dotted lines, a portion of the reflected light from screen 16 passes back through projection optics 14 and through one-way mirror splitter 32. This portion of the light image from screen 16 is magnified by 100-fold (×100) by telescopic sight 18. The CCD sensor array 20 senses this portion of the light image, and preferably senses a 10—10 pixel array, shown in FIG. 3, rendered a checker board by Sensor Data Processor 22 pattern at screen 16. CCD Sensor 20 samples each pixel at least 10 times for good resolution. As previously described with reference to FIG. 1, auto focus system 24 adjusts an optical parameter of the optical system, preferably the focal length of projector lens 14, preferably comprising a servo coupled to adjust the focal length, other optical parameters that could also be adjusted include as a function of the pixel sharpness determined by processor 22. Object Distance, magnification, f-stop, etc. that can be accomplished using a servo or other suitable control mechanism. Sensor data processor 22 determines the sharpness of the pixels 26 of the checker board pattern, as a function of the data provided by sensor 20.

Figure 5:
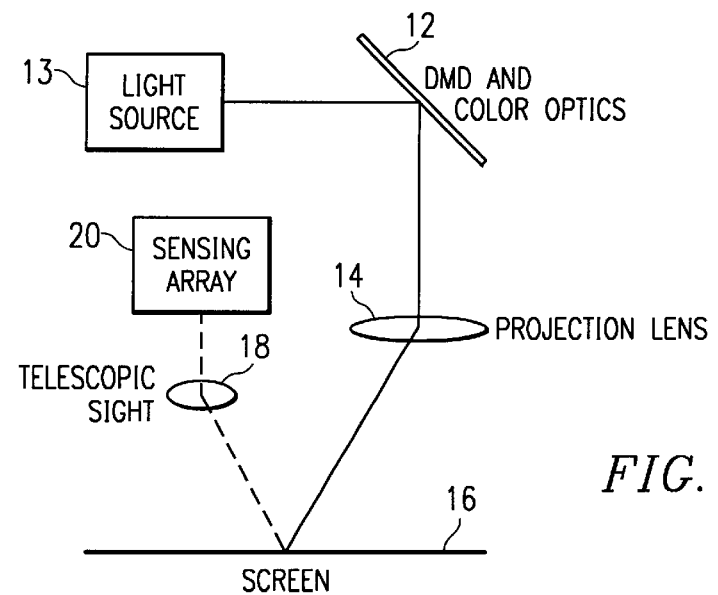
FIG. 5 is an illustration of an alternative preferred embodiment of the present invention whereby the optical sensing is performed by externally mounted sensing devices sensing an image at the display screen.

Referring now to FIG. 5, there is shown an alternative preferred embodiment of the present invention whereby the optical sensing is performed by externally mounted and bore sighted devices 18 and 20. The arrangement of the optical sensing devices is modified from that of FIG. 4 whereby the telescopic sight 18 is located lateral of the projector lens 14, with the telescopic sight 18 magnifying by 100-fold (100×) the selected pixels 26 of the image from screen 16 to the CCD sensor 20. The advantages of the embodiment of FIG. 5 are that there is no need for one-way mirror 32, and the alignment of the sensed reflected light path back through the projection optics 14 is not required. The advantages of the embodiment of FIG. 4, however, include the fact that the sensed image portion is through the same projection optics as the source image.

Figure 6:
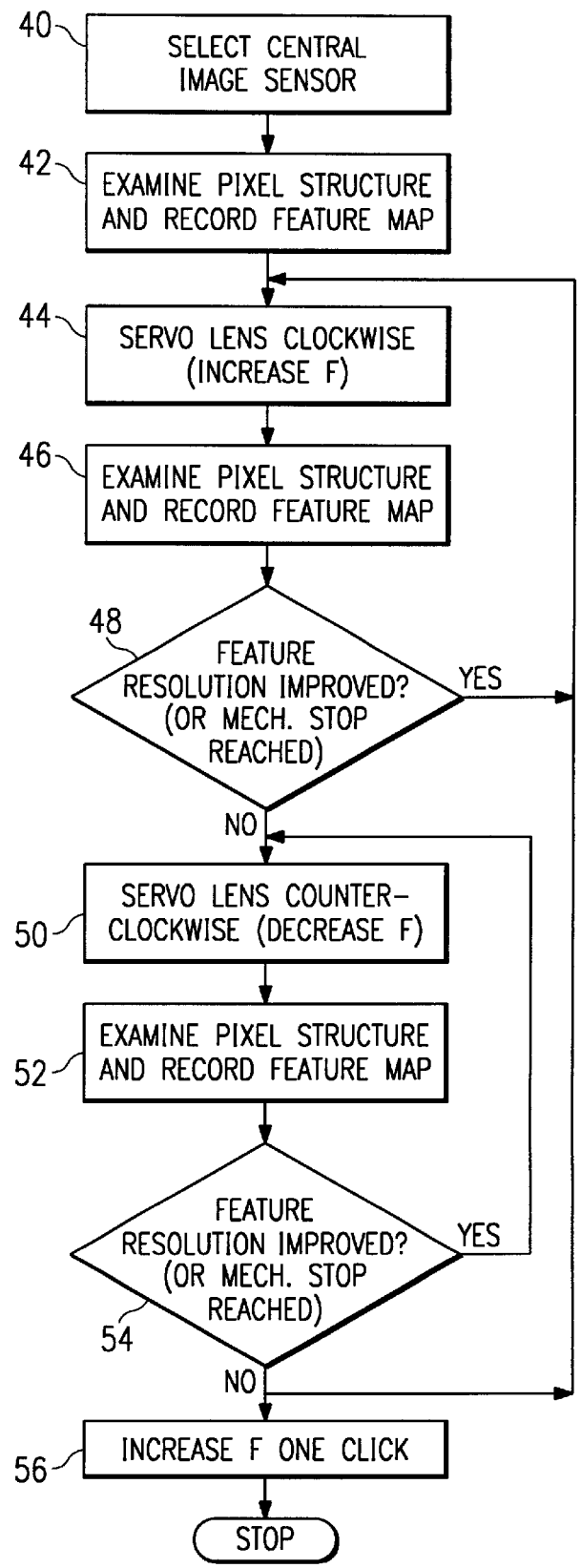
FIG. 6 is a functional flow diagram of the algorithm performed by the system of FIG. 1 whereby a servo lens is utilized to iteratively adjust the focus of the projector lens as a function of the sensed image at the display screen.

Referring now to FIG. 6, there is shown a flow diagram of a method of the present invention achieving an auto-focus of an SLM based image display system 10. At step 40, CCD sensor 20 senses several pixels 26 at a central portion of the image projected to screen 16. Sensor 20 is positioned to sense the pixels 26 at the center of screen 16, however, if so desired, the sensor 20 can be adjustable to selectively sense other portions of the image at screen 16 to insure focus of the entire image at screen 16 if desired.

As previously mentioned, during the auto focus routine, a checker board pattern is generated by image modulator 12 and projected onto screen 16. At step 42, sensor data processor 22 examines the pixel structure of the sensed pixels 26 provided by sensor 20, particularly, the sharpness of transitions 28 shown in FIG. 3. The intensity contrast between adjacent "on" and "off" pixels is sensed, whereby an output is provided by sensor 20 indicative of the contrast between these adjacent pixels to sensor processor 22. It is the characteristic signature of the pixels that is sensed, not the image formed by the pixels.

At step 44, auto focus system 24 adjusts an optical parameter of the optical system by adjusting a servo lens connected to projection lens 14 and increases the focal length F a predetermined amount.

At step 46, sensor data processor 22 again examines the pixel structure as in step 42.

At step 48, sensor data processor 22 determines if the feature resolution of those sensed pixels 26 is improved, and if a mechanical stop is not yet reached. If the answer is yes, the routine proceeds back to step 44. This loop is repeatively performed until at step 48 it is determined that the feature resolution is not improved, or that the mechanical stop is reached. Then, at step 50 the servo lens is rotated counter-clockwise to decrease the focal length F a predetermined amount.

At step 52, the structure of the sensed pixels 26 is again examined, as in steps 42 and 46. At step 54, sensor data processor 22 determines if the feature resolution is improved, and if the mechanical stop of the servo is not yet reached. If the answer is yes, the routine proceeds back again to step 50. If not, the routine may proceed back to step 44, which closes the loop of this algorithm, or will proceed to step 56 which increases the F one click.

The present invention achieves technical advantages by capitalizing on the geometric uniformity of the square pixel mirrors of a DMD device. Because the pixel mirrors of the DMD device are square and uniform, the pixels of the image at screen 16 are also square and uniform and are easily focused upon and sensed by CCD sensor 20. The sharpness of the pixel edges between adjacent on and off pixels 26 are easily discerned, and easily processed by sensor data processor 22. By maximizing the contrast or transition 28 between and "on" and an "off" pixel, auto focus system 24 adjusts the focal length of projector lens 14 until the image projected by lens 14 is in focus at screen 16.

The present invention is ideally suited for both front projection and rear projection systems. The present invention is also suited to use other SLM's that have regularly patterned pixels, such as LCD displays. Hence, limitation to a display system using a DMD-type SLM is not to be inferred.

Figure 7:
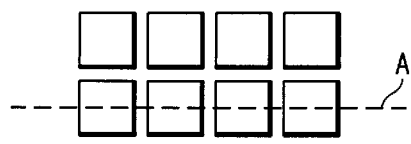
FIG. 7 is an alternative preferred method of the present invention whereby the sensed pixels are all "on"
Figure 8:
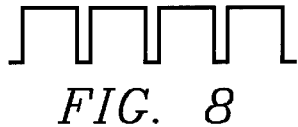
FIG. 8 illustrates the sensed pixel contrast across the pixels and the gaps between the "on" pixels of FIG. 7.

Referring to FIG. 7 and FIG. 8, an alternative method of the present invention that has even increased focusing sensitivity is to project an array of "on" pixels to screen 16. The DMD is particularly characterized in that each micromirror is 16 microns square on 17 micron centers. That is, there is a 1 micron gap between adjacent mirrors. By projecting an array of "on" pixels, sensor 20 senses the lack of reflected light along line A from between a pair of "on" pixels, as shown in FIG. 8. Sensor 20 has sufficient resolution to detect this gap in that it samples a pixel at least 10 times across one magnified pixel 26. At least a couple elements of the sensor 20 are used to sense the dark portion of the image between the "on" pixels. Processor 22 examines the sharpness defining this very small "off" portion of the image at screen 16. Thus, a very precise auto-focus method is achieved according to this preferred embodiment of the present invention.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

We claim:

1. An image display system, comprising:
    a light source generating light;
    a spatial light modulator modulating said light to form an image comprised of pixels;
    a display image plane;
    an optical system focusing said image on said image plane;
    a sensor sensing a focus of at least one said pixel projected on said image plane and providing a sensor output indicative thereof, said sensor output being a function of sensed sharpness of multiple said pixels projected on said image plane, and said sensed pixels have a high contrast in intensity from an "on" pixel to an "off" pixel; and
    adjustment means for altering a parameter of said optical system a function of said sensor output.

2. The image display system as specified in claim 1 wherein said optical system comprises a projector lens, wherein said adjusted parameter is a focal length of said projector lens.

3. The image display system as specified in claim 1 wherein said sensor provides said sensor output as a function of sensed sharpness of multiple said pixels projected on said image plane.

4. The image display system as specified in claim 3 wherein said sensed pixels comprise a regular geometric pattern.

5. The image display system as specified in claim 3 wherein said sensed pixels comprise a checker board pattern.

6. The image display system as specified in claim 1 wherein said sensor comprises a CCD camera.

7. The image display system as specified in claim 1 wherein said adjustment means comprised a servo mechanism.

8. The image display system as specified in claim 1 wherein said spatial light modulator comprises a DMD.

9. A method of focusing a display system including a light source generating light, a spatial light modulator (SLM) modulating the light, and an optical system comprising a projection lens focusing the modulated light on a display image plane, comprising the steps of;
    a) illuminating the SLM with the light to define an image comprised of pixels at the display image plane;
    b) sensing a sharpness of at least one pixel of the image at the display image plane, said sensing is performed from adjacent the projection lens, said sensing performed by sensing a transition between an "on" pixel and an "off" pixel; and c) adjusting an optical parameter of the optical system as a function of the sensed pixel sharpness.

10. The method as specified in claim 9 wherein said optical system comprises a projection lens, wherein said adjusting step comprises adjusting the focal length of the projection lens.

11. The method as specified in claim 9 including the step of sensing the sharpness of several pixels.

12. The method as specified in claim 9 comprising the step of using the SLM having micromechanical pixel-members each having a uniform geometry, whereby the pixels have corresponding said geometry.

13. The method as specified in claim 10 wherein step b) is performed by sensing the pixels through the projection lens.

14. The method as specified in claim 9 wherein the SLM is a DMD.

15. A method of focusing a display system including a light source generating light, a spatial light modulator (SLM) modulating the light, and an optical system focusing the modulated light on a display image plane, comprising the steps of;

a) illuminating the SLM with the light to define an image comprised of pixels at the display image plane;

b) sensing a sharpness of at least one pixel of the image at the display image plane, by sensing a transition between an "on" pixel and an "off" pixel; and c) adjusting an optical parameter of the optical system as a function of the sensed pixel sharpness.

16. The method as specified in claim 15 wherein said optical system comprises a projection lens, wherein said adjusting step comprises adjusting the focal length of the projection lens.

17. The method as specified in claim 15 including the step of sensing the sharpness of several pixels.

18. The method as specified in claim 15 comprising the step of using the SLM having micromechanical pixel-members each having a uniform geometry, whereby the pixels have corresponding said geometry.

19. The method as specified in claim 15 wherein the SLM is a DMD.

20. The method as specified in claim 16 wherein step b) is performed by sensing the pixels through the projection lens.

21. The method as specified in claim 16 wherein step b) is performed by sensing the pixels from adjacent the projection lens.

22. A method of focusing a display system including a light source generating light, a spatial light modulator (SLM) modulating the light, and an optical system focusing the modulated light on a display image plane, comprising the steps of;

a) illuminating the SLM with the light to define an image comprised of pixels at the display image plane, wherein said SLM is a micromechanical device having deflectable pixel-members with gaps defined therebetween;

b) sensing the sharpness of a portion of the image corresponding to the gaps between the pixel-members; and c) adjusting an optical parameter of the optical system as a function of the sensed pixel sharpness.

23. The method as specified in claim 22 wherein said optical system comprises a projection lens, wherein said adjusting step comprises adjusting the focal length of the projection lens.

24. The method as specified in claim 22 including the step of sensing the sharpness of several pixels.

25. The method as specified in claim 22 comprising the step of using the SLM having micromechanical pixel-members each having a uniform geometry, whereby the pixels have corresponding said geometry.

26. The method as specified in claim 22 wherein step b) is performed by sensing a transition between an "on" pixel and an "off" pixel.

27. The method as specified in claim 22 wherein the SLM is a micromechanical device having deflectable pixel-members with gaps defined therebetween, whereby step b) is performed by sensing a portion of the image corresponding the gaps between the pixel-members.

28. The method as specified in claim 22 wherein the SLM is a DMD.

29. The method as specified in claim 23 wherein step b) is performed by sensing the pixels through the projection lens.

30. The method as specified in claim 23 wherein step b) is performed by sensing the pixels from adjacent the projection lens.

31. A method of focusing a display system including a light source generating light, a micromechanical spatial light modulator (SLM) modulating the light, and an optical system comprising a projection lens focusing the modulated light on a display image plane, comprising the steps of;

a) illuminating the SLM with the light to define an image comprised of pixels at the display image plane;

b) sensing, from adjacent the projection lens, a sharpness of at least one pixel of the image at the display image plane by sensing a portion of the image corresponding to gaps between deflectable pixel members; and c) adjusting an optical parameter of the optical system as a function of the sensed pixel sharpness.

32. The method as specified in claim 31 wherein said optical system comprises a projection lens, wherein said adjusting step comprises adjusting the focal length of the projection lens.

33. The method as specified in claim 31 including the step of sensing the sharpness of several pixels.

34. The method as specified in claim 31 comprising the step of using the SLM having micromechanical pixel-members each having a uniform geometry, whereby the pixels have corresponding said geometry.

35. The method as specified in claim 32 wherein step b) is performed by sensing the pixels through the projection lens.

36. The method as specified in claim 31 wherein the SLM is a DMD.

* * * * *

UNITED STATES PATENT AND TRADEMARK OFFICE
CERTIFICATE OF CORRECTION

PATENT NO. : 6,246,446 B1
DATED : June 12, 2001
INVENTOR(S) : Scott Heimbuch and James Vorgert It is certified that error appears in the above-identified patent and that said Letters Patent is hereby corrected as shown below:

<u>Title page,</u>
Insert Item [60] under Related U.S. Application Data,
-- Provisional Application No. 60/020,875 Jun. 28, 1996. --

Signed and Sealed this

Thirty-first Day of December, 2002

JAMES E. ROGAN
*Director of the United States Patent and Trademark Office*